US010621517B2

(12) United States Patent
Deshpande et al.

(10) Patent No.: US 10,621,517 B2
(45) Date of Patent: Apr. 14, 2020

(54) REVERSE AUCTION BASED PULL MODEL FRAMEWORK FOR WORKLOAD ALLOCATION PROBLEMS IN IT SERVICE DELIVERY INDUSTRY

(75) Inventors: Prasad Manikarao Deshpande, Bangalore (IN); Dinesh Garg, Beawar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2175 days.

(21) Appl. No.: 11/938,061

(22) Filed: Nov. 9, 2007

(65) Prior Publication Data

US 2009/0125432 A1    May 14, 2009

(51) Int. Cl.
*G06Q 10/06* (2012.01)
*G06Q 40/04* (2012.01)

(52) U.S. Cl.
CPC ......... *G06Q 10/06* (2013.01); *G06Q 10/0631* (2013.01); *G06Q 40/04* (2013.01)

(58) Field of Classification Search
CPC .................................................. G06Q 10/0631
See application file for complete search history.

(56) References Cited

U.S. PATENT DOCUMENTS

| | | | |
|---|---|---|---|
| 6,449,341 B1 * | 9/2002 | Adams | H04M 3/08 379/1.01 |
| 6,587,831 B1 | 7/2003 | O'Brien | |
| 2001/0049615 A1 | 12/2001 | Wong et al. | |
| 2003/0004856 A1 * | 1/2003 | Brown | G06Q 10/109 705/37 |
| 2003/0212589 A1 | 11/2003 | Kish | |
| 2004/0088206 A1 | 5/2004 | Thompson et al. | |
| 2004/0093583 A1 * | 5/2004 | McAnaney | G06Q 10/10 717/103 |
| 2005/0071241 A1 | 3/2005 | Flockhart et al. | |

(Continued)

FOREIGN PATENT DOCUMENTS

WO    WO-2014164214 A1 *   10/2014

OTHER PUBLICATIONS

Amr Ahmed, Abhilash Patel, Tom Brown, MyungJoo Ham, Myeong-Wuk Jang, and Gul Agha; "Task Assignment for a Physical Agent Team via a Dynamic Forward/Reverse Auction Mechanism", University of Illinois-Urbana Champaign Computer Science Department, International Conference on Integration of Knowledge Intensive Multi-Agent Systems, Apr. 2005.*

(Continued)

*Primary Examiner* — Amanda Gurski
(74) *Attorney, Agent, or Firm* — Ference & Associates LLC

(57) ABSTRACT

A call center system for allocating problem tickets for technical services by using a pull model auction to select an agent to work on the problem ticket. When the call center receives an order for a technical service, it develops a complexity estimate for the tasks specified in the problem ticket, and calculates deadlines for completing the problem ticket and for conducting the auction. Invitations to bid on the problem ticket are sent to potential agents on a bidder's list. The winning bid is selected from among the bids received back from the potential agents, and, after evaluating the bids, the problem ticket is transferred to the winning agent.

22 Claims, 7 Drawing Sheets

(56) References Cited

U.S. PATENT DOCUMENTS

| | | |
|---|---|---|
| 2006/0085318 A1 | 4/2006 | Cohoon |
| 2006/0167790 A1 | 7/2006 | Gould et al. |
| 2007/0043651 A1 | 2/2007 | Xiao et al. |
| 2007/0116185 A1* | 5/2007 | Savoor et al. ............ 379/9 |
| 2007/0179829 A1* | 8/2007 | Laperi et al. ............ 705/9 |
| 2007/0219816 A1 | 9/2007 | Van Luchene et al. |
| 2008/0019500 A1* | 1/2008 | Torres et al. ............ 379/265.02 |
| 2012/0029962 A1 | 2/2012 | Podgurny et al. |

OTHER PUBLICATIONS

Amr Ahmed etal, "Task Assignment for a Physical Agent Team via a Dynamic Forward/Reverse Auction Mechanism", Apr. 2005, University of Illinois-Urbana Champaign Computer Science Department, International Conference on Integration of Knowledge Intensive Multi-Agent Systems, p. 311-317. (Year: 2005).*

Shi-Chung Chang, "Reverse Auction-Based Job Assignment Among Foundry Fabs", Int'l Journal of Production Research, vol. 45, No. 3, Feb. 1, 2007, pp. 653-673.

* cited by examiner

REVERSE AUCTION BASED PULL MODEL FRAMEWORK FOR WORKLOAD ALLOCATION PROBLEMS IN IT SERVICE DELIVERY INDUSTRY

BACKGROUND

Field

The present invention relates to queuing systems for allocating scarce resources, and in particular, a reverse auction allocation system for applying resources to incoming service request calls.

Description of Related Art

The allocation of the problem tickets to the human agents, sometimes called operators, is a key factor in deciding the efficiency and effectiveness of a call center or call-in service enterprise. Due to the highly globalized nature of any modem service enterprise, this problem is crucial in order to achieve maximum possible effectiveness, efficiency, and service quality. The "push" model is one conventional approach commonly used in the service industry. In a push model tickets are manually allocated to the agents by a manager. The manager accesses incoming problem tickets in a queue, and manually allocates each incoming problem ticket to an agent. Generally, the manager's selection of an agent is based on his/her knowledge of the individual agent's proficiencies for solving different kinds of problems, the current work load of individual agents, and the severity of the problem tickets.

The push model suffers from several drawbacks. For example, with a push model it becomes difficult for the manager to keep track of the proficiencies of individual agents once the size of the team grows beyond a limit. Thus, the push model does not typically scale well to global or even national levels. In push model, the managers use their own intuition/judgment to estimate the proficiency of an individual agent for a given problem area. However, such estimations are sometimes inaccurate and can rapidly become outdated as the proficiency of the agents evolves over time. Thus, the push model implemented by the manual decision making of a human manager suffers from drawbacks.

Conventional push models have also been automated using computer programs. Push models performed by a computer program allocate problem tickets on the basis of records indicating the expertise of the various agents. However, this approach also suffers from inefficiency since it is difficult to accurately capture and represent the skill of an agent. In a push model, the performance of an agent is typically measured by the number of problem tickets solved by that agent. The complexity of the problem is not given much consideration while measuring the agent's performance. Under such a scheme, there is little incentive for an agent to put in extra effort to fix a complex ticket. Agents tend to prefer tickets that are simple, and seek to avoid complex tickets or tickets that are not within their particular area of expertise.

Without an improved system for allocating problem tickets in a call center or service delivery organization responsible for incoming service request calls the promise of this technology may not be fully achieved.

SUMMARY

Embodiments disclosed herein address the above stated needs by providing systems, methods and computer products for allocating problem tickets to technical service agents engaged to fix them. A call-in service center receives an order from a customer for technical service and generates a problem ticket. The information from the problem ticket is used to develop a complexity estimate which includes an estimated time required by the expert agent to complete the problem ticket. This information, in turn, is used to calculate a deadline for completing the problem ticket. The system creates a bidder's list of potential agents to be invited to submit bids for the problem ticket. Bid invitations are sent out to the potential agents. The system receives bids back from at least some of the potential agents, evaluates the bids to select a winning agent, allocates the problem ticket to the winning agent, and assigns a reward value to the winning agent.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
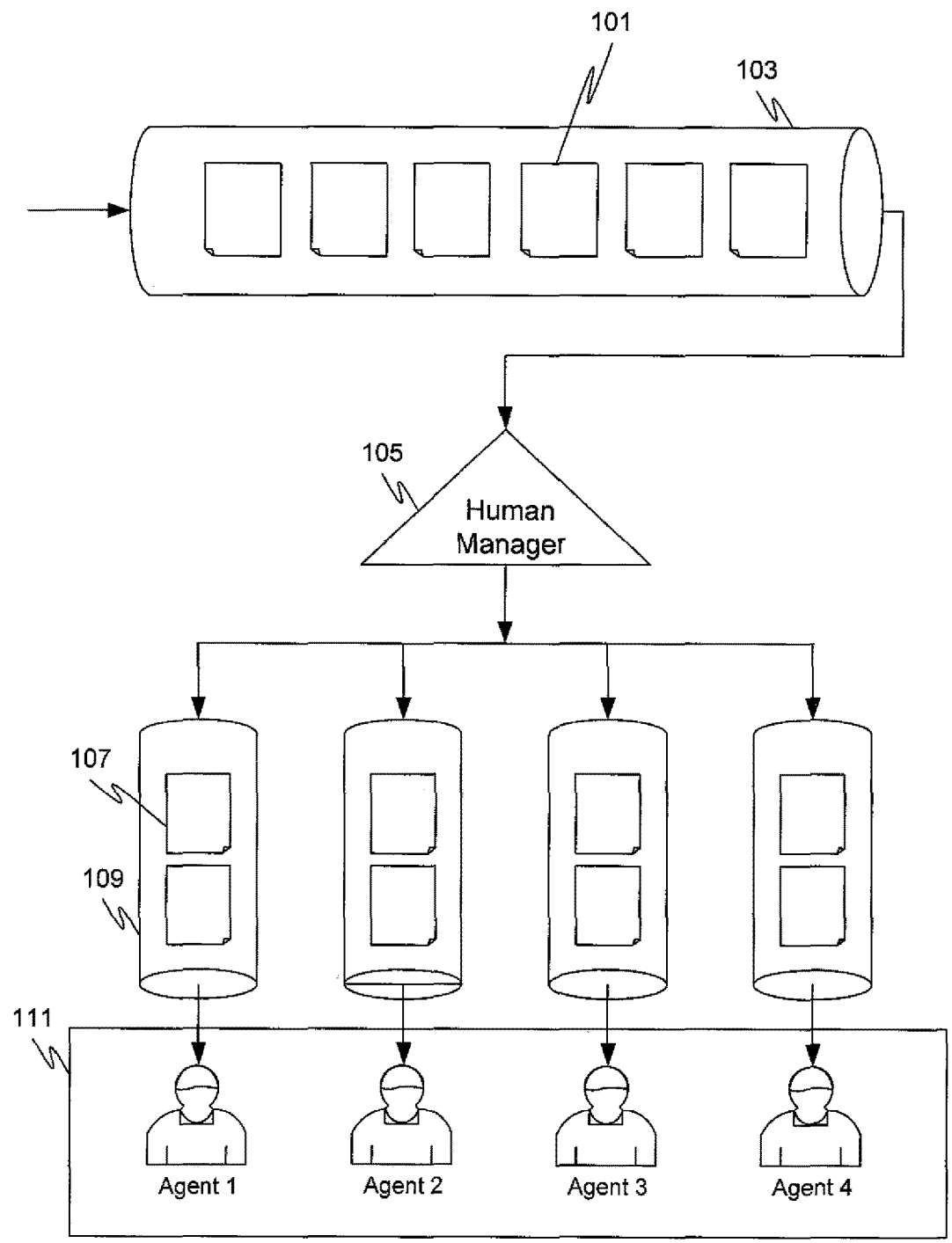
FIG. 1 depicts a typical push model system with limitations recognized by the present inventors.

FIG. 1 depicts a typical push model system 100 with limitations recognized by the present inventors. The push model 100 may be configured as a common mechanism across multiple service organizations for allocating problem tickets to the agents. The push model 100 includes a ticket queue 103 configured to hold the problems tickets 101. New problem tickets enter this queue at its entry tail, and proceed along in order until being assigned to a human manager 105 who keeps a watch at the head of the queue 103. The ticket at the head of the queue 103 is assigned to one of the agents 111 by the manager 105. The present inventors recognized the drawbacks due to the manager 105, since the manager 105 typically uses his/her own intuition, judgment, and past experience, sometimes applying predefined business rules in order to assign tickets to the agents. This manual push model method can be quite disadvantageous since it tends to rely on ad-hoc judgments that vary from manager to manager. Manager 105 takes into account several factors while deciding which agent the ticket should be allocated to, including, for example, the current work load of individual agents 111, the proficiency of various agents 111 in solving the problem ticket in hand, and the severity of the ticket. As recognized by the present inventors, the effectiveness of the push model 100 is controlled solely by the efficiency and accuracy that the manager 105 exhibits in sorting, judging and assigning the incoming problem tickets.

There is a queue 109 associated with each agent 111. A ticket 107 which is allocated to the agent 111 enters the queue at its tail. The agent 111 picks a new ticket to work on from the head of the queue 109 as soon as the agent's previous ticket is completed. This model is called a push model because problem tickets are pushed by the manager towards the agents.

Figure 2:
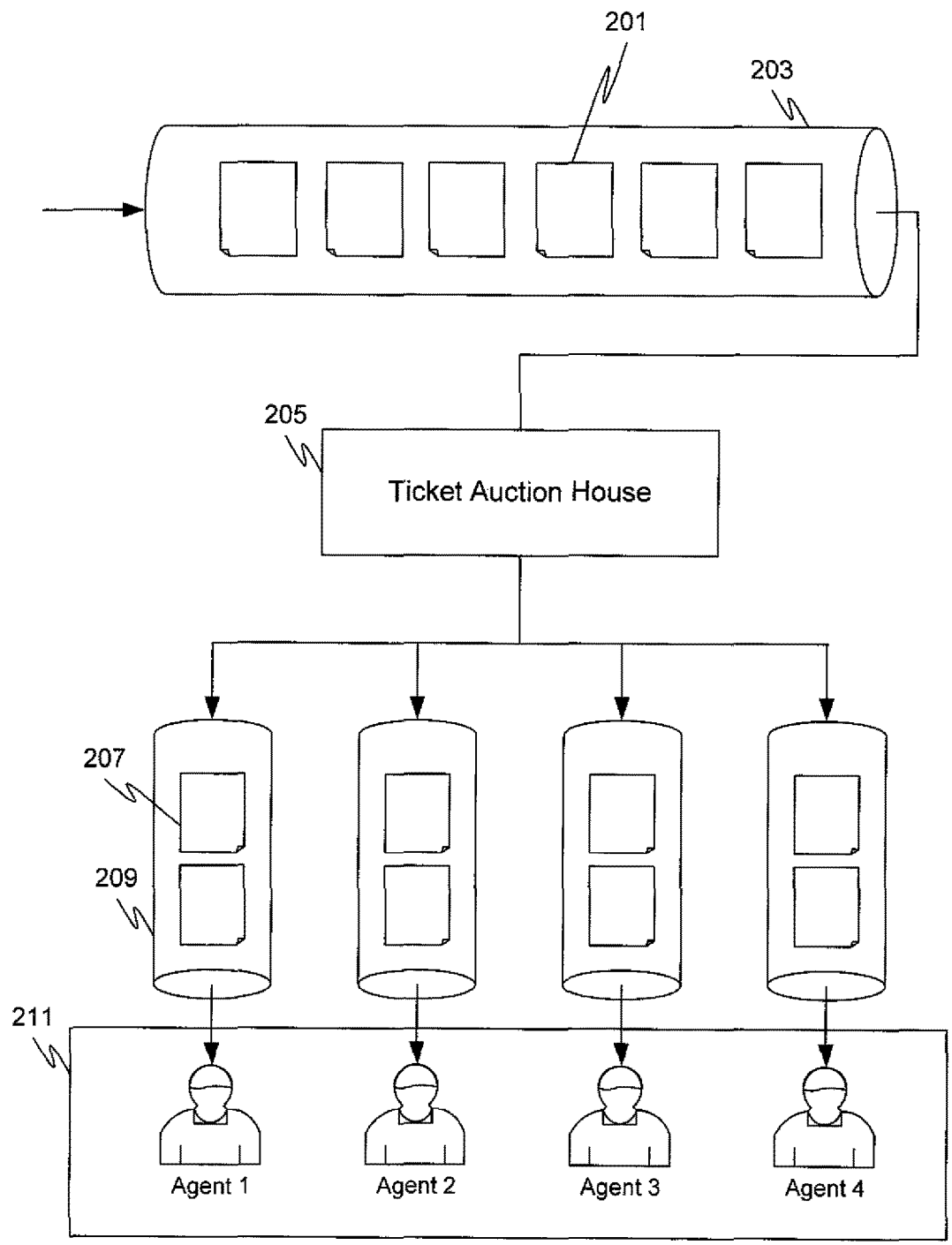
FIG. 2 depicts an exemplary pull model system in accordance with various embodiments of the invention.

FIG. 2 depicts an exemplary pull model system 200 in accordance with various embodiments. This model is referred to as a pull model because, unless an agent shows an interest to work on a problem ticket, the ticket will not be allocated to him. In other words, rather than having tickets pushed to an agent, the agent pulls a ticket from auction house 205 by expressing interest in working on it, e.g., bidding on it.

The pull model 200 includes a ticket queue 203 which holds the problem tickets 201. Problem tickets may also be known as work orders, service requests, or other like terms. In the pull model system 200 of FIG. 2 a new problem ticket enters the queue 203 at its entry tail end. The pull model may be implemented as a software application program or other logic to control and perform various activities of the ticket auction house 205. In various exemplary embodiments the software application may, itself, be referred to as a ticket auction house, or it may be referred to as a pull model or other such terms. The auction house 205, for the most part, eliminates the need for a human manager 105 of the FIG. 1 push model 100.

The auction house 205 keeps a watch or otherwise monitors the head of the queue 203, which is opposite the input end where tickets 201 are received. The ticket at the head of the queue 203 is allocated to one of the agents 211 by the auction house 205. Further details of the auction house 205, as well as the activities and systems used by it to allocate the tickets to the agents, are discussed in more detail later in this disclosure, for example, in conjunction with FIGS. 3-7.

In the pull model 200 of FIG. 2 there is a queue 209 associated with each agent 211. A ticket 207, which is allocated to the agent 211 by the auction house application 205, enters this queue at its tail, that is, the queue 209 input closest to the auction house 205, as depicted in FIG. 2. The agent 211 picks a new ticket to work on from the head end of the queue as soon as the agent completes the current ticket on which he/she is working. In some embodiments the agent 211 may work on two or more tickets simultaneously, in which case a ticket may optionally be provided to the agent 211 before completion of a current ticket being worked on.

Figure 3:
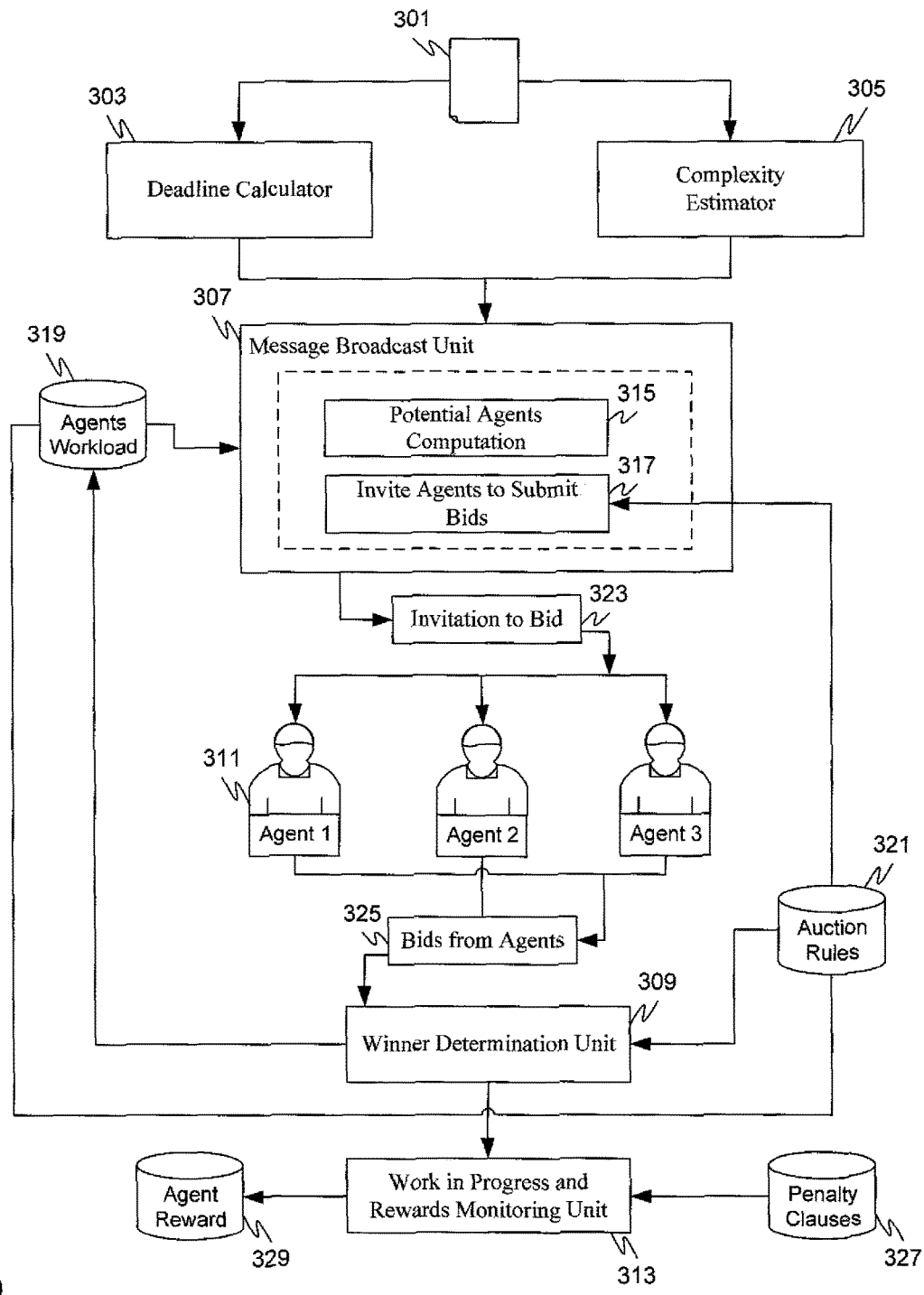
FIG. 3 is an illustrative component block diagram of ticket auction house in accordance with various embodiments of the invention.

FIG. 3 is an illustrative component block diagram of ticket auction house 300 in accordance with various embodiments. The auction house 300 may be divided into a number of major functional units, including a deadline calculator 303, a complexity estimator 305, a message broadcast Unit 307, a winner determination unit 309, and a work in progress and reward monitoring unit 313. These units, and other functional components of the ticket auction house 300, may be implemented either in hardware or in software, or a combination of both. Further discussion of hardware and software suitable for practicing the various embodiments is provided in conjunction with FIG. 7 of this disclosure.

A problem ticket 301 which is taken for processing by auction house 300 is typically sent to both the deadline calculator 303 and the complexity estimator 305. These functions may be conducted one after another, or in parallel as depicted in FIG. 3. The deadline calculator 303 is configured to compute the deadlines, or timing goals, by which this problem ticket should preferably be completed. The deadline is the time by which the ticket 301 of its classified severity level must by fixed by the service organization that receives the ticket 301. The deadline may either be expressed as a time of day (e.g., 3:00 o'clock) or in terms of a number of time units (e.g., 12 minutes). The deadlines may be based on contractual obligations. For example, the service organization responsible for running the call centers generally has a service level agreement (SLA) signed with each client organization that hires them for their services. In the SLA, the problem tickets may be classified into several levels of severity, with each severity level being associated with a time duration for completing the task of the problem ticket. The deadlines computed by the deadline calculator 303 may be based on the SLA specified time durations. The various SLA, or relevant data from the SLA, may be programmed into the deadline calculator 303 in order to facilitate the calculation of the deadline by which an incoming ticket is required to be fixed or otherwise completed.

The complexity estimator 305 estimates the time required by an agent having the appropriate skills to fix a given problem 301. The complexity estimator 305 may be implemented as a machine-learning-based software program whose purpose is to get an estimate of the time to completion for a particular problem ticket 301. This software may be structured to operate by mining the data regarding previous, similar problems tickets solved by various agents, and the time taken to solve those problem tickets. In this way the time estimate for completing a task may be based on empirical data processed by the complexity estimator 305. The empirical data may include previous estimates and their corresponding results for completing the problem ticket. In some embodiments the complexity estimator 305 uses a machine learning and data mining based approach to develop the appropriate kinds of statistics that can eventually be used for estimating the time required to solve new incoming tickets 301. In various embodiments the complexity estimator 305 may be programmed with one or more estimating factors such as empirical data of estimates/results, management opinions, efficiency/performance observations, mathematical relationships, or other like types of logic suitable for estimating the time required to solve new incoming tickets 301. In regards to deadlines versus complexity estimates, a deadline from the deadline calculator 303 may be thought of as a goal or obligation for the time that the task is to be completed. A complexity estimate, on the other hand, is a best guess as to how long it will take to complete the task.

The output of the deadline calculator 303 and output of the complexity estimator 305 are used to develop a bid invitation broadcast message that is distributed to the agents 311 by the message broadcast unit 307. In some embodiments the message broadcast unit 307 may be configured to include two subcomponents, namely, the potential agents component 315 (also called the potential agents computation component 315) and the bid invitation component 317. In other embodiments the potential agents component 315 and bid invitation component 317 may be configured as units themselves, and not be included as part of the message broadcast unit 307. The potential agents component 315 computes which agents among the entire group of agents 311 may have suitable characteristics to be considered for working on the problem ticket 301. This may include those agents 311 who possess suitable technical skills and training, who have good performance records, who are judged to have good interpersonal skill, who have worked successfully with this particular client before, who have solved similar problems in the past who have developed a particular expertise, and/or any other like type of agent competency factors that may affect the performance of the agent 311 in solving the problem ticket. The potential agents component 315 takes, as inputs for the ticket 301, the past performance of various agents 311 in view of the deadline value and the estimated time from the deadline calculator 303 and any other predefined factors deemed relevant. The potential agents component 315 may also get inputs from the agents workload tracker 319 regarding the current workload of all the agents 311. This component adds up the estimated time from the complexity estimator 305 to the current workload and computes the expected time by which an individual agent 311 will be able to address the problem ticket 301 if it is assigned to that agent 311. Making use of these factors the compute potential agents component 315 selects those of the agents 311 who would be able to fix the problem ticket 301 before the specified deadline. The potential agents component 315 passes this set of potential agents to the bid invitation component 317.

The bid invitation component 317 typically performs tasks related to conducting the bidding process. The bid invitation component 317 uses auction rules from the auction rules database 321 to decide on an auction closing time. The auction closing time may be based on factors such as the number and identities of potential agents participating in the auction, the severity of the ticket, the ticket deadline, or other like types of considerations. The bid invitation component 317 uses the relevant considerations to create a new auction for the ticket 311 at hand. Once the auction has been set up, or otherwise organized to proceed, the bid invitation component 317 sends a bid invitation broadcast message 323 to all the participating agents 311 describing the problem ticket 301, estimated time to compete the ticket the deadline, and the auction closing time, along with an invitation for the participating agents 311 to submit bids. In another embodiment the bid invitation component may not actually send out a message. Rather, the agents are expected to check periodically with the system to find open auctions for which they are eligible.

In another embodiment, the potential agents computation component 315 can also use additional business rules to decide the potential agents. For example, a rule may be established saying that Severity 1 tickets should be assigned to only a specific set of agents deemed to be more reliable or otherwise specially qualified. The bid of an agent is the belief of the agent about the time that is required to fix this ticket if that agent works on this ticket. For example, one of the potential agents 311 may bid 30 minutes which implies that this particular agent thinks that he can solve this problem ticket 301 in 30 minutes or less. These bids 325 of the agents are given as input to the winner determination unit 309. The winner determination unit 309 waits until the closing time of the auction and if it receives at least one bid, decides who among the bidders should be assigned the ticket to work upon. In some implementations the bidding may be closed early if a predetermined number or percentage of the bids have been returned (e.g., 30%, 50%, 75%, or other percent between 5% to 90% of bid invitations 323 returned). Basing the bid closing on a returned-percent, rather than waiting for the full bidding time to expire, tends to give the winning agent more time during which to complete the problem ticket 301. If no bids are received by the auction closing time, the closing time of the auction may be extended for certain period based on auction rules 321, taking into account parameters such as previous auction durations, the number of times the deadline has been extended, and the severity of the ticket.

Assuming that at least one bid is received from the agents 311, the winner determination unit 309 decides the auction winner based on the auction rules which are stored in an auction rules database 321. An auction rule often consists of two sub rules, the winner determination rule and the payment (sometimes known as the reward rule). After the ticket 301 has been awarded to one of the agents 311, the work-in-progress and rewards monitoring unit 313 are used to track progress of the ticket 301, and oversee payment of the reward 329 to the winning agent 311 for successful completion of the ticket 301 or mete out a penalty 327 if the ticket 301 is not completed, errors are committed, or the task is completed beyond the deadline (without any justification).

In the event that no more deadline extensions are allowed, as per the auction rules 321, and no bids have been received yet, the ticket auction house 300 may be configured to take an alternative course of action to allocate the ticket. For example, the winner determination unit 309 may be programmed to send the ticket to a push model. This embodiment is described further, in conjunction with the hybrid model depicted in FIG. 4. Alternatively, the winner determination unit 309 may be programmed to assign the problem ticket 301 to an agent without conducting a bid process, in the event no acceptable bids have been received and no more deadline extensions are allowed.

The winner determination unit 309 contains winner determination rules designed to select the optimal (or an optimal) agent 311 to receive the ticket 301. A sample winner determination rule (which may alternatively be called an efficient allocation rule) may be in the form:

If,
$b_i$=Bid of agent i (the time that agent i would take to solve the problem ticket)
$B_i$=Time into future through which agent i is busy
$C_i=b_i+B_i$=Time into future by which agent i will solve the ticket (completion time), then, the agent who has the minimum value of $C_i$ is declared the winner. After deciding the winner, the winner determination unit 309 updates the agents' workload database 319 for the agent 311 receiving this ticket into his workload queue. (e.g., queue 209 of FIG. 2).

The last functional unit of the ticket auction house 300 is work-in-progress and rewards monitoring unit 313. For each agent 311, the work-in-progress and rewards monitoring unit 313 monitors the tickets that have been assigned to him/her, as recorded in the agents' workload database 319. If an agent 311 does not solve the allocated ticket by the allotted deadline, then the work-in-progress and rewards monitoring unit 313 may be configured to ask the agent questions regarding the performance/completion of the ticket such as: "Does the agent needs additional time to solve the ticket? or "If the agent cannot solve the ticket, would the agent like to pass it back to the auction house?" For each ticket an agent completes within the allotted time limit, the unit work-in-progress and rewards monitoring unit 313 assigns a reward 329 to the agent based on a payment rule defined as part of auction rules that are stored in the auction rules database 321. A sample payment rule (which may alternatively be called second price payment rule when used in conjunction with efficient allocation rule, or other like term) may be as follows:

Let,
$C_1$=Completion time of winning agent $C_2$=Completion time of best losing agent (second lowest value) then, the winning agent will get a reward of $b_1+(C_2-C_1)$ It can be shown that this exemplary payment rule used in conjunction with the efficient allocation rule leads to a truthful mechanism. The agents 311 have no incentive to report untruthful estimates leading to an efficient allocation. The auction house 300 may be configured to use other payment rules as well, or payment rules with other units. For example, the reward in the above expression is on the scale of time, unit but this scale may be adjusted to reflect other values, sush as rewards (e.g., money). The reward 329 of an agent 311 may be stored in a reward database associated with the winning agent 311.

For each ticket that an agent 311 completes in T time extra than the allocated, the auction house 300 may also assign a penalty to the agent based on penalty clause 327 instead of, or in addition to, the giving the agent 311 payment as per the payment rule. A typical penalty clause may take a form similar to the following:

If, agent i has taken T amount of extra time to solve a ticket, then the Agent receives a penalty of $(\alpha T)$ where $\alpha > 0$. In the above rule, $\alpha$ is a tunable parameter intended to discourage over aggressive bidding. Typically, a is chosen such that $\alpha < 1$, since it is difficult to estimate the time required for a ticket accurately and there is no desire to unduly penalize the agents 311. The penalty in the above expression is on the scale of time units, but this scale can appropriately be adjusted to reflect some real world penalty such as money. The penalty 327 of an agent 311 is typically stored in a reward database associated with the agent 311, so that the penalty may be reflected in the agent's 311 compensation for a given pay period along with any rewards the agent 311 is owed.

Figure 4:
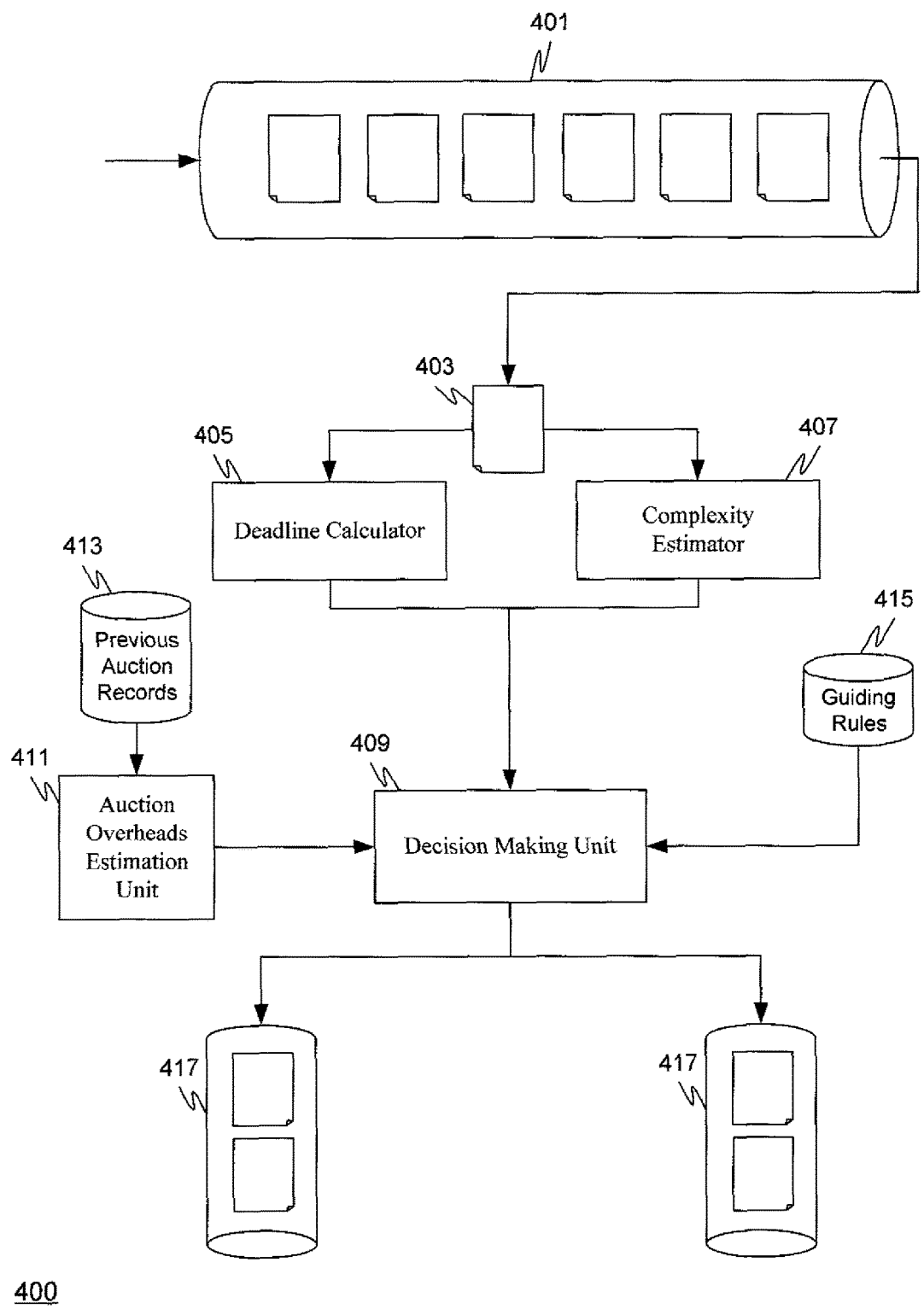
FIG. 4 is an illustrative component block diagram of a hybrid ticket auction house in accordance with various embodiments of the invention.

FIG. 4 is an illustrative component block diagram of a hybrid ticket auction house 400 in accordance with various embodiments. While the pull model is scalable and efficient, the push model gives more control to the manager to handle special cases and high priority tickets. The hybrid model 400 illustrated in FIG. 4 combines advantages of both the push model and the pull model. One main feature of hybrid model 400 is that it provides control points by which it can be tuned to behave like any model within the whole range between a push model and a pull model.

The hybrid model 400 includes a ticket queue 401 which holds and propagates the problems tickets as they are received from customers. A new problem ticket enters the queue 401 at its tail end. When it is time to process the ticket 403 it is sent to both the deadline calculator 405 and the complexity estimator 407. The deadline calculator 405 computes the deadlines by which this problem ticket must be fixed in a manner similar to operation of the deadline calculator 303 of FIG. 3. The complexity estimator 407 computes an estimate of the time required by an expert agent to fix a given problem ticket in a manner similar to operation of the complexity estimator 305 of FIG. 3. The output of the deadline calculator 405 and output of the complexity estimator 407 are fed into the decision making unit 409. The decision making unit 409 whether the ticket 403 should be allocated by means of push model or pull model logic, or a combination of both models. The decision making unit 409 may be configured to operate in the following exemplary manner. It may first receive an input from auction overhead estimation unit 411. This input may be based on past auction records 413. The input may be used by the decision making unit 409 as an estimate of how much time will be required in the process of auctioning the problem ticket 403, including, for example, time for computing the potential agents, inviting these agents to submit bids, and determining the winner. The decision making unit 409 reads the appropriate decision making rule from guiding rules database 415. The decision making rule typically operates on the three inputs from the deadline calculator 405, the complexity estimator 407, and the auction overhead estimation unit 411, respectively, which the decision making unit 409 has already received. Based on these inputs the decision making unit 409 decides whether this ticket 403 should be allocated by means of push model logic or pull model logic, or any other available model or a combination thereof. An exemplary decision making rule may be in a format similar to that of the following paragraph:

If, (Auction Overhead Time+Estimate Time to Solve Ticket) exceeds the deadline then, the ticket should be allocated by Push Model logic, otherwise, the ticket should be allocated by Pull Model logic, unless, the ticket is of Severity 1, then use the Push Model logic since Severity 1 are critical tickets for which the overhead of an auction should be avoided.

The auction overhead estimation unit 411 may be configured to mine the previous auctions records database 413. The previous auctions records database 413 consists of previous problem tickets that were allocated by means of pull model and the corresponding time spent in the process of auctioning the ticket. The auction overhead estimation unit 411 is typically configured as a machine learning based software program whose purpose is to get an estimate of the how much time would be required in the process of auctioning a given ticket 403. The activities of the overhead generally include computing potential agents, inviting these agents to submit bids, and determining the winning agent. Once the decision making unit 409 decides how to allocate the ticket 403, and makes an allocation decision to distribute the ticket to a particular agent, the ticket 403 is put into a ticket queue 417 associated with the winning agent.

Figure 5:
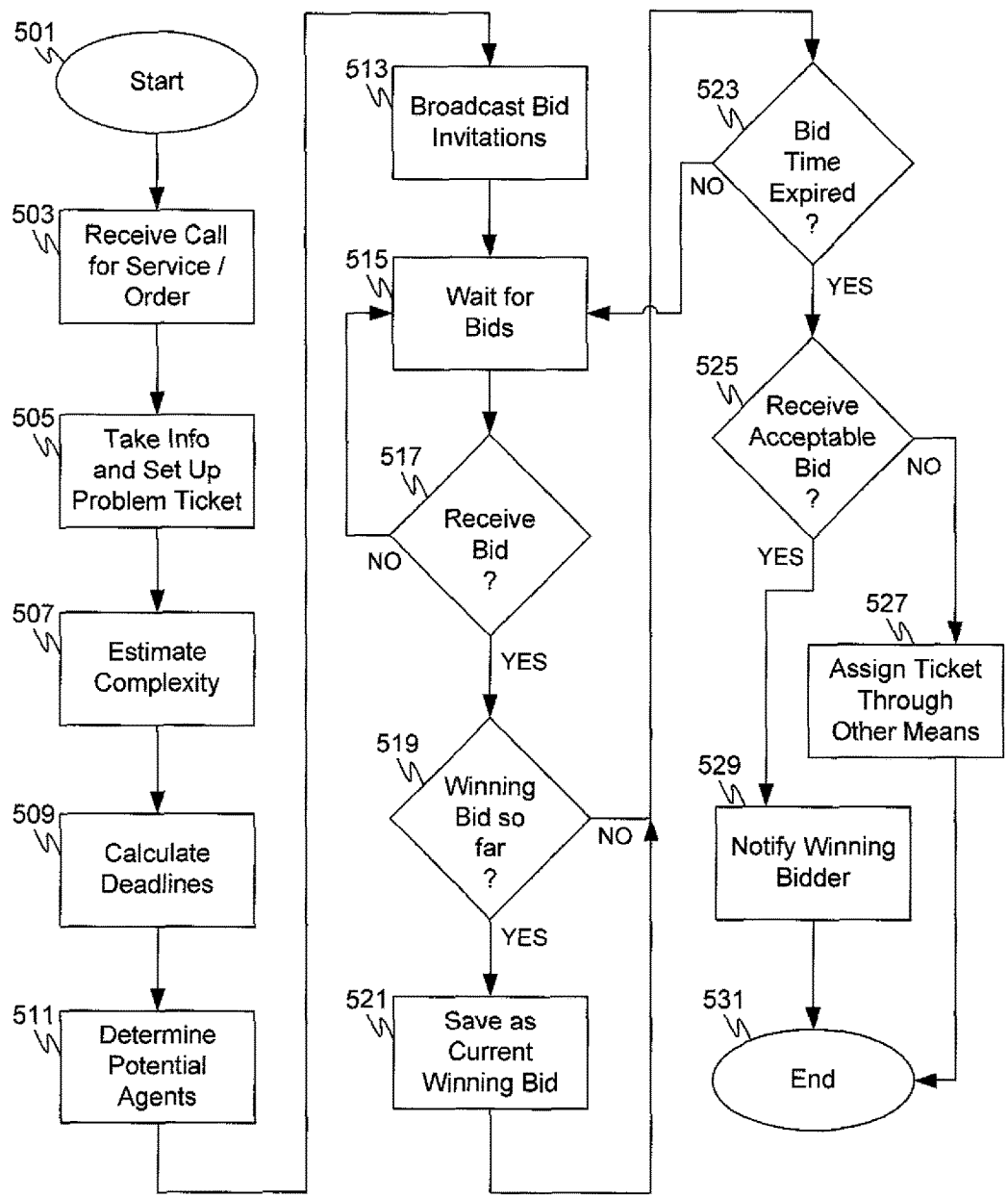
FIG. 5 is a flow diagram of an exemplary method for allocating problem tickets with a pull model according to various embodiments of the invention.

FIG. 5 is a flow diagram 500 of an exemplary method for allocating problem tickets with a pull model according to various embodiments of the invention. The method begins at 501 and proceeds to 503 where an order is received for the problem ticket. The order may be a call to a technical help line from a customer seeking technical service such as help or direction for fixing a technical problem with equipment (e.g., computer or telecommunication equipment, or consumer electronic devices), configuring the equipment, or otherwise operating the equipment. The order may be received at a telephone call center, or may be any other sort of communication from a customer seeking personal service that must be performed by an expert or other technician (e.g., an email, Internet chat communication, or the like). The order may also be generated by the service delivery organization itself, by a person monitoring the system when he/she finds a fault that needs to be fixed. If the order is a telephone call, for example, to a call center, the operator or other person receiving the call typically enters information concerning the order into a computer. This may be done by typing the information in via the keyboard, mouse or other input device. The pull model with a ticket auction house according the various embodiments disclosed herein can be used to distribute many different types of service request calls. However, for the purposes of illustrating and explaining the invention, various embodiments will be discussed in terms of receiving a telephone call at a call center requesting help to fix a technical problem, even though other implementations are within the scope of this disclosure. The method proceeds to 505 to take the relevant information from the caller, e.g., the nature of the technical problem, the type of computer, software, or other device experiencing problems, the caller's name, the caller's native language, and other like types of information generally useful for a service call. Once 505 is completed and the relevant information for the problem ticket has been recorded the method proceeds to 507.

In 507 the complexity of the problem is estimated in order to provide an estimate of the time required to complete the task of the problem ticket by an agent having the appropriate skills for the task. This may be done in some embodiments using a complexity estimator 305 as shown in FIG. 3. Once the complexity estimate is completed the method proceeds to 509 to calculate the deadlines for the problem ticket. In 509 the deadline for completing the task or other service may be calculated. Block 509 may also entail the calculation of a deadline for conducting the reverse auction to distribute the problem ticket to an agent. In some embodiments the problem complexity estimate of 507 and the deadline calculation of 509 may be performed in parallel while in other embodiments these activities may be performed one after the other (in either order).

Once the deadline(s) have been calculated and the problem complexity estimate is complete the method proceeds to 511 to determine which of the agents are available and have the relevant skills to participate in the auction as agents to be included in the bidders' list. Relevant skills may include experience and/or training relating to the task of the problem ticket. A listing of the various agents' relevant skills may be documented by the call center for use for developing the bidders' list of potential agents by maintaining a database of relevant skills for each agent. Agents who are not presently working (e.g., either on vacation, sick, or working on a different time shift) are not included on the bidders' list. Also, agents whose workload is too great, or who already have one or more problem tickets pending, may not be good candidates to be included on the bidders' list. Of course, agents who have well established skills (e.g., experience and/or training) relating to the nature of the problem are good candidates for the bidders list, so long as they do not have too great a workload. Agents who may not have as much experience/training may also be included if they have expressed an interest in the topic of the problem ticket, and if there is a sufficient amount of time before the deadline to accommodate such agents having a less than desired level of experience/training.

Once 511 is completed and a bidders' list has been generated the method proceeds to 513. In 513 the bid invitations are sent as broadcast messages to the agents on the bidders' list. The bid invitations may be communicated by any mode of available communication suitable for sending such messages. For example, the bid invitations may be sent by a text-based electronic communication such as emails, instant messaging, wireless pages, text messages, short message service (SMS), posts in an Internet chat room or message board, or other like types of electronic text-based communication. In some implementations the bid invitations may be sent in the form of telephone or radio calls, intercom announcements, or other like types of audible communication. The bid invitations do not necessarily need to be sent out to all potential bidders by the same communication means. For example, some bidders may prefer to receive bid invitations by email while others may prefer text messages or pages. The system can use a combination of communication means to send out the bid invitations. A profile of each agent may be kept which specifies the agent's preference(s) for the type of communication used to send bids to that agent. It should also be noted that the bids do not necessarily need to be sent out at the same time. Instead, the bids may be sent out to a first list of bidders, then later, before the bidding session is closed, may be sent out to other bidders. Once the bid invitations have been sent the method proceeds to 515 to wait for incoming bids from the agents. In some implementations the invited bidders may be able to see what the amount of the winning bid, while in other implementations the bidders must simply submit their own bid without any information about the level of the current winning bid. The method then proceeds to 517 to determine whether any incoming bids have been received. If no bids have been received, the method loops back from 517 along the "NO" path to 515 to wait further for returned bids. If a bid has been received the method proceeds from 517 along the "YES" path to 519.

In 519 the system compares the received bid to any other bids received back so far and determines whether it is the winning bid, up to that point in the bidding process. Typically, the winning bid will be the bid that has the lowest estimate for completion of the problem ticket. However, in some instances the system may be configured to scale or adjust the bids in a certain manner. For example, if an agent bidder has an established tendency to underestimate the time he takes to complete tasks on problem tickets, the system may be programmed to adjust his bids to more reasonable levels, based on his past performances. In some implementations, factors other than the estimated time to complete the problem ticket may also be considered in evaluating the winning bid. One such factor may be the labor rates of the bidders. For example, a bid of 12 minutes for an agent receiving $8 per hour may be judged to be better than a bid of 10 minutes for an agent receiving $15 per hour. In other implementations, the bids may be evaluated in terms of whether they meet a predetermined threshold (e.g., 14 minutes), and then taking the lowest priced agent who meets that threshold. Returning to block 519, if the current bid is determined to be the winning bid so far the method proceeds from 519 along the "YES" path to 521 to save the bid. The method then proceeds to 523 to determine whether the bidding period has expired. Back in 519, if it is determined that the current bid is not the winning bid the method proceeds from 519 along the "NO" path to 523.

In 523 the timer is checked to see whether the time for receiving further bids has expired. If the bidding time has not yet expired the method proceeds from 523 along the "NO" path to 515 to wait for further bids. However, if it is determined in 523 that the bidding period has expired, then the method proceeds from 523 along the "YES" path to 525. In 525 it is determined whether or not any acceptable bids were received back from the agents on the bidders list. An acceptable bid may, in some instances, be required to be beneath a predetermined time estimate threshold (e.g., a bid of no greater than 12 minutes for the agent to complete the task). Further, if the winning bidder responded to a number of other bids and won some of them, his/her bid may be judged to be unacceptable since that bidder no longer has the workload capacity to take on new work. In block 525, if it is determined that the bidding process did not result in any acceptable bids the method proceeds along the "NO" path to 527, and the system uses other means to assign the ticket to an agent. In some embodiments, such as the hybrid ticket auction house model of FIG. 4, the system may opt to let a manager manually assign the ticket to an agent. In other embodiments, block 527 may entail another round of bidding (if there is sufficient time), opening the bidding process to other agents who were excluded or otherwise unavailable for the first round of bidding. Once 527 is completed the method proceeds to 531 and ends. Returning to block 525, if it is determined that the bidding process returned at least one acceptable bid the method proceeds from 525 along the "YES" path to 529 to notify the winning bidder. Then the method proceeds to 531 and ends, and the system begins monitoring the progress of the winning bidder in completing the tasks specified in the problem ticket.

Figure 6:
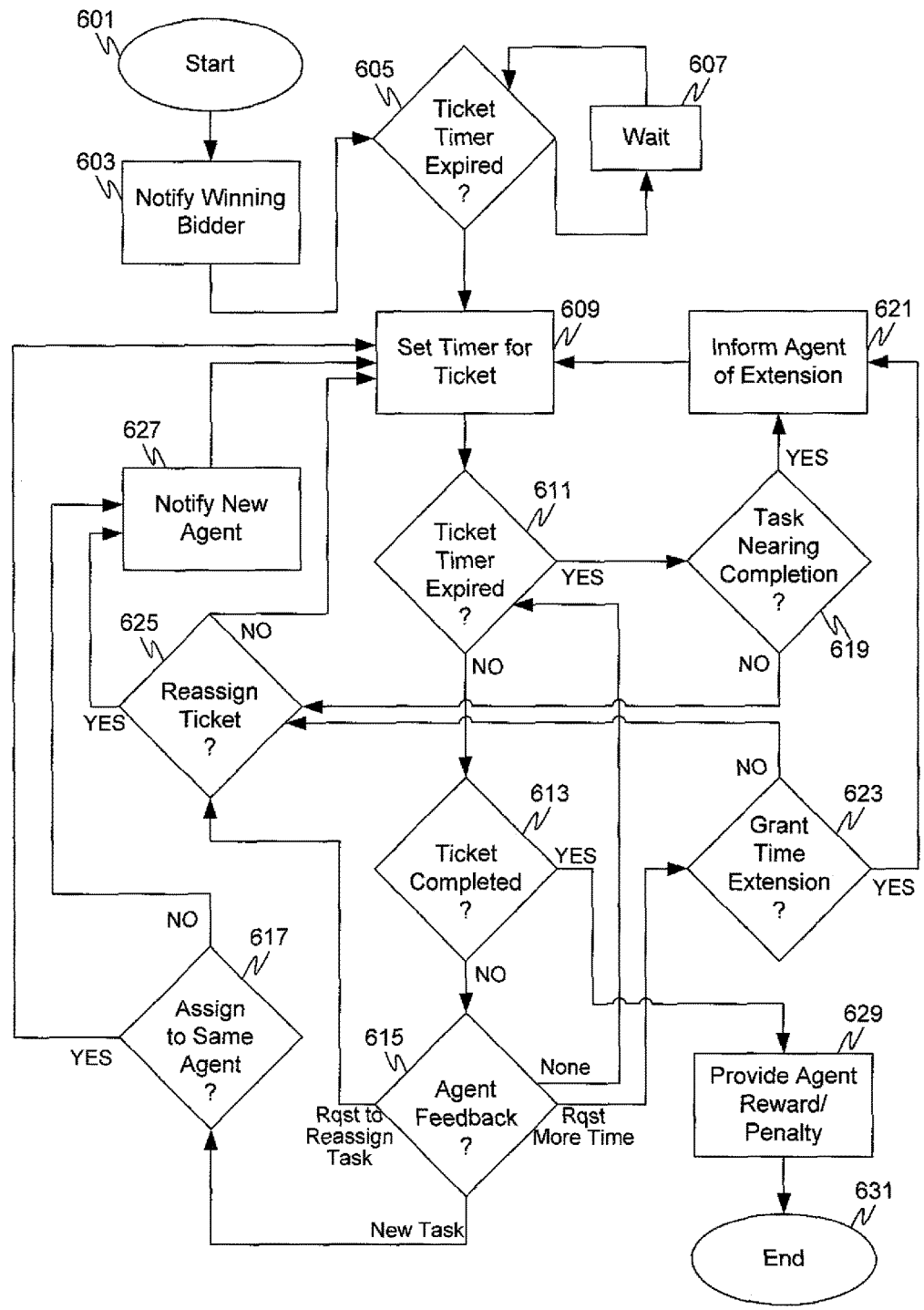
FIG. 6 is a flow diagram of an exemplary method for monitoring an agent's progress in performing the task of a problem ticket according to various embodiments of the invention.

FIG. 6 is a flow diagram 600 of an exemplary method for monitoring an agent's progress in performing the task of a problem ticket according to various embodiments. The agent's performance of the problem ticket typically involves real-time interaction between the customer and the agent (e.g., a customer service representative, technician, or the like). The method begins at 601 and proceeds to 603 to notify the winning bidder agent of their success in winning the bid for the problem ticket. At this time any further details concerning the task of the problem ticket that were not included in the bid information may also be forwarded to the winning bidder (hereinafter, simply called the "agent"). The method then proceeds to 605 to determine whether the agent has picked up the problem ticket and begun to work on it. If it is determined in 605 that the agent has not yet begun the problem ticket the method proceeds along the "NO" path to 607 to wait, then looping back to 605. Once the agent has begun the problem ticket the method proceeds from 605 along the "YES" path to 609.

In 609 the timer is set to run for the estimated time of completion for the problem ticket. Typically, the timer is set to the time specified in the agent's winning bid. However, in some embodiments the timer may be adjusted to provide more time if the winning bid time was less than the estimated deadline. In some embodiments the timer is started as soon as the agent is sent the ticket without waiting for the agent to pick up the problem ticket to work on. In such embodiments the method proceeds directly from notifying the agent of the winning bid in 603 to starting the timer in 609. These embodiments help to prevent the agent from building too big a backlog in the queue of tickets allocated to that agent. Once the timer has been set in 609 the method proceeds to 611 to determine whether the ticket timer has expired.

If it is determined in 611 that the timer has not yet expired the method proceeds from 611 along the "NO" path to 613 to determine whether the ticket is completed or not. If, in 613 it is determined that the task of the problem ticket has not yet been completed the method proceeds along the "NO" path to see whether the agent has provided any feedback for the system. If the agent has not provided any feedback the method loops back from 615 along the "NONE" path to 611 to again check to see whether the timer has expired. However, if it is determined in 615 that the agent has requested that the ticket been reassigned to another agent the method proceeds from 615 along the path labeled "RQST TO REASSIGN TASK" to 625. In block 625 the systems determines whether the task is to be reassigned to another agent. In some instances the task of a problem ticket may be beyond the capabilities of the agent assigned to it, or the task may involve a different technology than it was originally thought to be, or the call may be judged to be a hostile or otherwise uncooperative caller. It such instances it may be best to transfer the problem ticket to another agent. This can be done by proceeding along the "YES" path from 625 to 627 to notify the new agent that the ticket has been assigned to him. The assignment of the problem ticket to a new agent may entail running a new bidding process, as described above in conjunction with FIG. 5. Alternatively, the problem ticket may be assigned manually by a manager as discussed above in conjunction with FIG. 1. Once the problem ticket has been assigned, and the new agent notified in 627, the method proceeds to 609 to set the ticket timer again, giving the new agent a deadline to complete the problem ticket. If, in 617, it is determined not to transfer the problem ticket to another agent, the method proceeds from 617 along the "NO" path to 609 to reset the ticket timer for a more appropriate time for the agent. This is done since the agent, more likely than not realizes that it is beyond his capabilities to solve the problem ticket by the deadline. In some implementations, the "NO" path from 617 may instead proceed to 611 without readjusting the ticket timer.

Returning to block 615, sometimes during the course of fixing a problem ticket a customer may request that another problem be solved. Unless the new problem is trivial, it makes sense to give the agent credit for the solving the new problem. In some instances it may make sense to transfer the new problem to another agent, especially if the new problem is of a different nature than the task of the original problem ticket. In block 615, if the agent indicates that the customer has a new task to be solved the method proceeds from 615 along the "New Task" path to 617. In practice, it sometime happens that the new problem is introduced before the original task has been completed-in which case the new problem is noted in block 615, and as soon as the original task of the problem ticket is completed (as indicated in 613) the method proceeds from 613 to 617. In 617 it is decided whether to let the same agent have the new problem or assign it to a different agent (e.g., either manually assign it, or run another bidding session). If the same agent is to solve the new problem the method proceeds from 617 along the "YES" path to 609 to set the timer for the new problem. This may entail running the problem through the complexity estimator and deadline calculations of blocks 505 and 507 of FIG. 5. If it is determined in 617 to assign the new problem to a different agent (e.g., because the current agent is not adequately qualified, has to great a workload, etc.), the method proceeds from 617 along the "NO" path to 627 to notify the new agent of the problem being assigned to him. The process of assigning the new problem to a different agent may, in some instances, entail performing a bidding session for the new problem.

Returning again to 615, in the event the agent requests more time to complete the problem ticket the method proceeds from 615 along the "Rqst More Time" path to 623. In block 623 the system determines whether or not to grant an extension of time. In some situations the system may grant an extension of time without penalizing the agent, for example, if solving the problem ticket resulted in unforeseen difficulties or if the customer proves to be difficult to deal with. In other situations, an extension may be granted but the agent will suffer a penalty for not completing the problem ticket by the given deadline, e.g., a monetary penalty is levied. If it is decided in 623 to grant an extension of time the method proceeds from 623 along the "YES" path to 621 and the agent is informed of the time extension being granted. The method then proceeds from 621 back to 609 to reset the ticket timer to reflect the extension of time. Returning to 623, if it is decided not to grant the extension of time the method proceeds from 623 along the "NO" branch to 625 to consider whether or not to reassign the problem ticket to another agent. In some embodiments the method may instead proceed from 623 along the "NO" branch to 611 without considering whether or not to transfer the problem ticket to another agent.

Returning to 613, if it is determined that the problem ticket is completed the method proceeds from 613 to 629. In 629 the agent's performance is evaluated, for example, considering whether the agent completed the task within the time of his bid, and whether the customer indicated that the problem had been solved to his satisfaction. The review may, in some instances, involve monitoring the conversation between the agent and the customer, either at the time the problem ticket is being worked on or by reviewing a tape recording of the conversation at a later time. Once the agent's performance has been properly evaluated the system can provide the agent with compensation, and at this time any penalties incurred may be applied as well. Upon completing the reward/penalty phase in 629 the method proceeds to 631 and ends.

Figure 7:
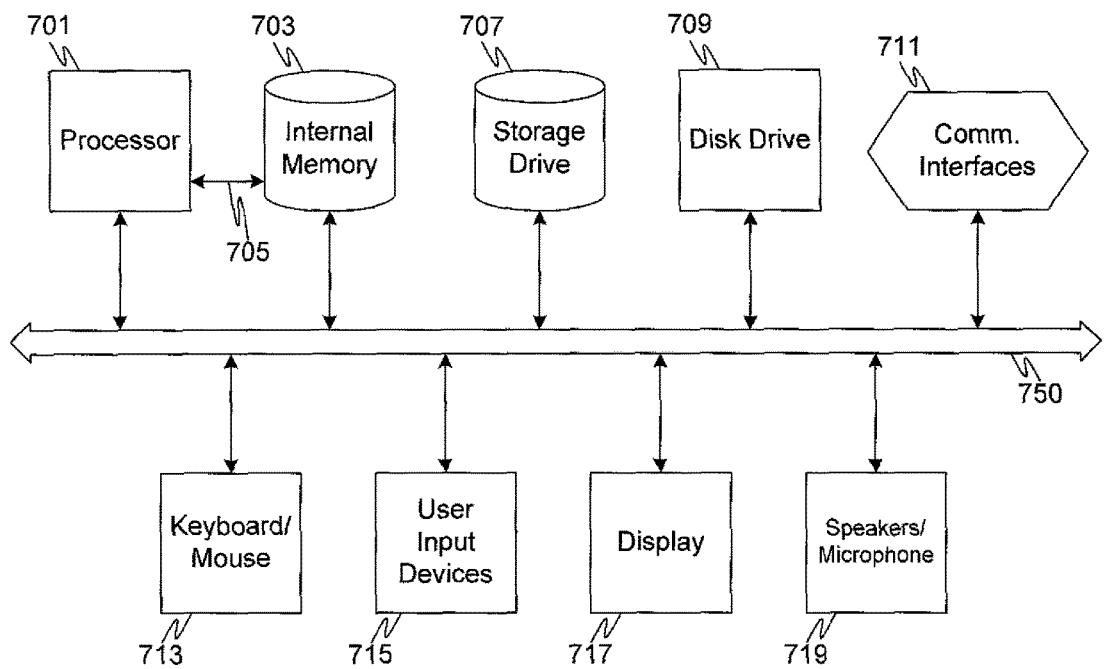
FIG. 7 is a computer system suitable for implementing various embodiments of the invention.

FIG. 7 depicts an exemplary computer system 700 that may be used to implement various embodiments of the invention. The computer system 700 includes a processor 701 which may be embodied as a microprocessor or central processing unit (CPU). The processor 701 is typically configured to access an internal memory 703 via a bus such as the system bus 750. The internal memory 703 may include one or more of random access memory (RAM), read-only memory (ROM), cache memory, or a combination of these or other such circuitry configured to store information in a retrievable format. In some implementations the internal memory 703 may be configured as part of the processor 701, or separate from it but within the same packaging. The processor 701 may be able to access internal memory 703 via a different bus, or via control lines (e.g., local bus 705) than it uses to access the other components of computer system 700.

The computer system 700 also typically includes, or has access to, one or more storage drives 707 and floppy disk drives 709. The storage drive 707 is often a hard disk drive configured for the storage and retrieval of data, computer programs or other information. The floppy disk drives 709 may include a combination of several disc drives of various formats that can read and/or write to removable machine readable medium. The machine readable medium may be any of the various available storage formats, including, for example, CD-R, CD-RW, DVD, DVD-R, floppy disk, or the like. The computer system 700 may either include the storage drives 707 and floppy disk drives 709 as part of its architecture (e.g., within the same cabinet or enclosure), as connected peripherals, or may access the storage drives 707 and floppy disk drives 709 over a network, or a combination of these. The storage drive 707 is often used to store the software, instructions and programs executed by the computer system 700.

The computer system 700 may include communication interfaces 711 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 700 may be interconnected by a bus 750 and/or may include expansion slots conforming to any of various industry standards such as PCI (Peripheral Component Interconnect), ISA (Industry Standard Architecture), or EISA (enhanced ISA).

Typically, the computer system 700 includes one or more user input/output devices such as a keyboard and/or mouse 713, or other means of controlling the cursor (e.g., touchscreen, touchpad, joystick, trackball, etc.) represented by the user input devices 715. A display 717 is also generally included as part of the computer system 700. The display may be any of several types of displays, including a liquid crystal display (LCD), a cathode ray tube (CRT) monitor, a thin film transistor (TFT) array, or other type of display suitable for displaying information for the user. The display 717 may include one or more light emitting diode (LED) indicator lights, or other such display devices. In addition, most computer systems 700 also include, or are connected to, one or more speakers 719 and microphones 721 for audio output and input. Speech recognition software may be used in conjunction with the microphones 721 to receive and interpret user speech commands.

In regards to the methods disclosed herein for practicing the various embodiments, many of the specified activities and steps may be included, or excluded, or performed in a different order than described above, with the rest of the activities still remaining within the scope of at least one exemplary embodiment. For example, block 519 may be performed after the bid time has expired as determined in block 523, in which case block 521 is performed following the new position of block 519. Other activities may either be omitted or performed in a different order than depicted in the exemplary figures included herein, and still be within the scope of the invention.

The invention may be implemented with any sort of processing units, processors and controllers (e.g., processor 701 of FIG. 7) capable of executing a program of instructions for performing the stated functions and activities. For example, the processor 701 may be embodied as a microprocessor, microcontroller, DSP, RISC processor, or any other type of processor that one of ordinary ski would recognize as being capable of performing the functions described herein. A processing unit in accordance with at least one exemplary embodiment can operate computer software programs stored (embodied) on computer-readable medium such as the internal memory 703 or storage drive 707, e.g. hard disk, CD, flash memory, ram, or other machine readable medium as recognized by one of ordinary skill in the art. The computer software or other programs of instructions can aid or perform the steps and activities described above. For example computer programs in accordance with at least one exemplary embodiment may include: source code for developing a complexity estimate for a problem ticket, source code for calculating a deadline for completing the problem ticket; source code for determining a bidder's list of potential agents from among a plurality of agents; source code for inviting the potential agents on the bidder's list to submit bids for the problem ticket; source code for receiving bids back from at least some of the potential agents; source code for evaluating the bids to select a winning agent; and source code for allocating the problem ticket to the winning agent. There are many further source codes that may be written to perform the stated steps and procedures above, and these are intended to lie within the scope of exemplary embodiments.

The use of the word "exemplary" in this disclosure is intended to mean that the embodiment or element so described serves as an example, instance, or illustration, and is not necessarily to be construed as preferred or advantageous over other embodiments or elements. The term problem ticket may also be known as a work order, a task order, a repair request, a service request, or other like terms requesting a service, an explanation or exchange of information. An order for a problem ticket is typically received at a receiving location (e.g., a 1-800 telephone call to a calling center) and then handed off, or otherwise distributed, to one of a plurality of agents engaged to solve the problem ticket. Although the various embodiments have been described in terms of responding to problem tickets, the embodiments may be used to implement any queuing system that requires allocation of tasks for performance of a skilled response.

The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of directing a telephone call to a winning agent among a plurality of agents, the method comprising:
    providing one or more storage drives configured to store an auction rules database that includes a plurality of auction rules;
    receiving, via the telephone call, an order at a call center from a customer for technical service, the technical service being described in a problem ticket;
    placing the problem ticket in a queue comprising received problem tickets, wherein the queue and problem tickets in the queue are monitored and allocated using an auction house application, wherein instructions executed by the auction house application are stored within a memory device and the instructions of the auction house application are executed utilizing a processor;
    calculating, using the auction house application, a first deadline for completing a bidding process to allocate the problem ticket to the winning agent, wherein the first deadline comprises a deadline for completion of the problem ticket required by the customer corresponding to the problem ticket, wherein the calculating comprises, classifying the problem ticket into a severity level, accessing a service level agreement corresponding to the customer and having time durations corresponding to severity levels, and determining the first deadline based upon the time duration identified within the service level agreement corresponding to the severity level of the problem ticket;
    calculating, using the auction house application and said auction rules, an estimate of a time needed for completing the problem ticket based upon a complexity estimate for the problem ticket, wherein the complexity estimate is performed by a machine-learning-based software program and identifies an amount of time required by agent, having an identified set of skills, to fix a problem identified within the problem ticket, wherein the machine-learning-based software program identifies an amount of time by accessing previous problem tickets having a similarity to the problem ticket, identifying an estimate associated with the previous problem tickets, identifying an actual time required to complete the previous problem ticket, and developing statistics related to an amount of time for completing types of problem tickets, wherein the machine-learning-based software program is continually updated based upon new problem tickets and results of the new problem tickets, thereby refining complexity estimates made by the machine-learning-based software program;
    inviting, using the auction house application, a bidder's list of potential agents from among the plurality of agents to bid on the problem ticket, wherein the bidder's list comprises agents (i) having the identified set of skills to fix the problem identified within the problem ticket within the estimate and (ii) able to fix the problem ticket before the first deadline;
    receiving, at the auction house application, bids back from one or more of the potential agents;
    evaluating, using the auction house application, the bids to select a winning bid associated with the winning agent, wherein the winning bid comprises a bid having a soonest completion time as compared to the other bids; and
    allocating, using the auction house application, the problem ticket to the winning agent and directing the problem ticket to said winning agent;
    wherein the bidder's list of the potential agents comprises agents scheduled to be present at work for the call center from at least an auction closing time until said first deadline for completing the problem ticket.

2. The method of claim 1, further comprising:
    setting the auction closing time; and
    declining to receive further bids after the auction closing time.

3. The method of claim 1, wherein the potential agents employed by the call center are invited to submit bids by an electronic communication selected from a group consisting of email, instant messaging, text messaging, and wireless paging.

4. The method of claim 1, wherein the bids returned from the potential agents are evaluated to select the winning bid based upon an estimate of a time to complete the problem ticket and an agent wage rate.

5. The method of claim 1, further comprising:
    monitoring progress of the winning agent in completing the problem ticket; and
    managing an incentive program for the winning agent in completing the problem ticket, wherein the incentive program can include one or more of a reward or penalty as provided for in a service level agreement.

6. The method of claim 1, further comprising:
    determining whether any of the bids returned from the potential agents are acceptable; and
    manually assigning the problem ticket to one agent among the plurality of agents in response to determining that none of the bids returned from the potential agents are acceptable.

7. A software product comprising a non-transitory machine readable medium including a program of instructions for partitioning a model comprising a plurality of variables representing state elements, wherein the program of instructions upon being executed on a computer causes the computer to direct a telephone call by performing activities comprising:
    providing one or more storage drives configured to store an auction rules database that includes a plurality of auction rules;
    receiving, via the telephone call, an order at a call center from a customer for technical service, the technical service being described in a problem ticket;
    placing the problem ticket in a queue comprising received problem tickets, wherein the queue and problem tickets in the queue are monitored and allocated using an auction house application, wherein instructions executed by the auction house application are stored within a memory device and the instructions of the auction house application are executed utilizing a processor;
    calculating, using the auction house application and said auction rules, wherein the first deadline comprises a deadline for completion of the problem ticket required by the customer corresponding to the problem ticket, wherein the calculating comprises, classifying the problem ticket into a severity level, accessing a service level agreement corresponding to the customer and having time durations corresponding to severity levels, and determining the first deadline based upon the time duration identified within the service level agreement corresponding to the severity level of the problem ticket;

calculating, using the auction house application, an estimate of a time needed for completing the problem ticket based upon a complexity estimate for the problem ticket, wherein the complexity estimate is performed by a machine-learning-based software program and identifies an amount of time required by agent, having an identified set of skills, to fix a problem identified within the problem ticket, wherein the machine-learning-based software program identifies an amount of time by accessing previous problem tickets having a similarity to the problem ticket, identifying an estimate associated with the previous problem tickets, identifying an actual time required to complete the previous problem ticket, and developing statistics related to an amount of time for completing types of problem tickets, wherein the machine-learning-based software program is continually updated based upon new problem tickets and results of the new problem tickets, thereby refining complexity estimates made by the machine-learning-based software program;

inviting, using the auction house application, a bidder's list of potential agents from among a plurality of agents to bid on the problem ticket, wherein the bidder's list comprises agents (i) having the identified set of skills to fix the problem identified within the problem ticket within the estimate and (ii) able to fix the problem ticket before the first deadline;

receiving, at the auction house application, bids back from one or more of the potential agents;

evaluating, using the auction house application, the bids to select a winning bid associated with a winning agent, wherein the winning bid comprises a bid having a soonest completion time as compared to the other bids; and allocating, using the auction house application, the problem ticket to the winning agent and directing the telephone call to said winning agent;

wherein the bidder's list of the potential agents comprises agents scheduled to be present at work for the call center from at least an auction closing time until said second deadline for completing the problem ticket.

8. The software product of claim 7, further comprising: setting the auction closing time; and
declining to receive further bids after the auction closing time.

9. The software product of claim 7, wherein the potential agents employed by the call center are invited to submit bids by an electronic communication selected from a group consisting of email, instant messaging, text messaging, and wireless paging.

10. The software product of claim 7, wherein the bids returned from the potential agents are evaluated to select the winning bid based upon an estimate of a time to complete the problem ticket and an agent wage rate.

11. The software product of claim 7, further comprising: monitoring progress of the winning agent in completing the problem ticket; and managing an incentive program for the winning agent in completing the problem ticket, wherein the incentive program can include one or more of a reward or a penalty as provided for in a service level agreement.

12. The software product of claim 7, further comprising: determining whether any of the bids returned from the potential agents are acceptable; and
manually assigning the problem ticket to one agent among the plurality of agents in response to determining that none of the bids returned from the potential agents are acceptable.

13. A system for directing a telephone call to an agent among a plurality of agents, the system comprising:
a keyboard configured to receive inputs with information of an order for technical service received via the telephone call, the technical service being described in a problem ticket, said inputs being based on an order received at a call center from a customer for technical service;
a memory configured to store an auction rules database that includes a plurality of auction rules and algorithms for developing a complexity estimate for the problem ticket, said complexity estimate including an estimated time required by an expert agent to complete the problem ticket;
an auction house application configured to perform instructions, stored within a memory device and executed utilizing a processor, for placing problem tickets received in a queue, monitoring the queue and problem tickets in the queue, allocating the problem tickets within the queue, calculating a first deadline for completing a bidding process to allocate the problem ticket to the winning agent, and for calculating an estimate of a time needed for completing the problem ticket based on a complexity estimate for the problem ticket, said auction house application further being configured to determine a bidder's list of potential agents from among the plurality of agents, wherein the first deadline comprises a deadline for completion of the problem ticket required by the customer corresponding to the problem ticket, wherein the calculating comprises, classifying the problem ticket into a severity level, accessing a service level agreement corresponding to the customer and having time durations corresponding to severity levels, and determining the first deadline based upon the time duration identified within the service level agreement corresponding to the severity level of the problem ticket, wherein the complexity estimate is performed by a machine-learning-based software program and identifies an amount of time required by agent, having an identified set of skills, to fix a problem identified within the problem ticket, wherein the bidder's list comprises agents (i) having the identified set of skills to fix the problem identified within the problem ticket within the estimate and (ii) able to fix the problem ticket before the first deadline wherein the machine-learning-based software program identifies an amount of time by accessing previous problem tickets having a similarity to the problem ticket, identifying an estimate associated with the previous problem tickets, identifying an actual time required to complete the previous problem ticket, and developing statistics related to an amount of time for completing types of problem tickets, wherein the machine-learning-based software program is continually updated based upon new problem tickets and results of the new problem tickets, thereby refining complexity estimates made by the machine-learning-based software program; and a communication interface configured to send bid invitations to the potential agents on the bidder's list to submit bids for the problem ticket, said communication interface further being configured to receive bids back from at least some of the potential agents;

wherein the instructions are configured to evaluate the bids to select a winning bid associated with a winning agent, allocate the problem ticket to the winning agent, and direct the telephone call to said winning agent, wherein the winning bid comprises a bid having a soonest completion time as compared to the other bids; and wherein the bidder's list of the potential agents comprises agents scheduled to be present at work for the call center from at least an auction closing time until said second deadline for completing the problem ticket.

14. The system of claim 13, further comprising:

the call center having a plurality of telephones each suitable for receiving calls from the customer;

wherein the potential agents employed by the call center are invited to submit bids by an electronic communication selected from a group consisting of email, instant messaging, text messaging, and wireless paging.

15. The system of claim 13, wherein the communication interface is configured to send and receive electronic communications selected from a group consisting of email, instant messaging, text messaging, and wireless page; and wherein the auction house application is further configured to perform instructions excluding from the bidder's list those among the among the plurality of agents who already has one or more existing problem tickets pending.

16. The method of claim 1, wherein the bidder's list is a first bidder's list, the method further comprising:

inviting a second bidder's list of potential agents from among the plurality of agents to bid on the problem ticket, the second bidder's list being sent out after the first bidder's list.

17. The software product of claim 7, wherein the bidder's list is a first bidder's list, the software product further comprising:

inviting a second bidder's list of potential agents from among the plurality of agents to bid on the problem ticket, the second bidder's list being sent out after the first bidder's list.

18. The method of claim 1, further comprising:

excluding from the bidder's list those among the among the plurality of agents who are not scheduled to be present at work from the auction closing time until said second deadline; and excluding from the bidder's list those among the among the plurality of agents who already has one or more existing problem tickets pending.

19. The software product of claim 7, the software product further comprising:

excluding from the bidder's list those among the among the plurality of agents who are not scheduled to be present at work from the auction closing time until said second deadline; and excluding from the bidder's list those among the among the plurality of agents who already has one or more existing problem tickets pending.

20. The method of claim 1, wherein the machine-learning-based software program (i) mines data from previously completed problem tickets, wherein the previously completed problem tickets comprise data identifying a time estimate for completing the corresponding ticket and an actual time for completing the corresponding ticket, and (ii) develops statistics, from the mined data, associated with a time required for completing a ticket having an identified problem.

21. The method of claim 1, wherein determining the agents able to fix the problem ticket before the first deadline comprises (i) adding the estimated time to a current workload of an agent and (ii) determining that the current workload plus the estimated time results in a completion time before the first deadline.

22. The method of claim 1, wherein the agents of the bidder's list further are agents that are identified as qualified for working on tickets of the severity level.

* * * * *